(12) United States Patent
Leung et al.

(10) Patent No.: US 7,562,838 B2
(45) Date of Patent: Jul. 21, 2009

(54) FOOD PROCESSOR BOWL AND FOOD PROCESSOR

(75) Inventors: Chi Wah Leung, Hong Kong (CN); Chi Chung Fung, Hong Kong (CN); Shek Chuen Luk, Hong Kong (CN)

(73) Assignee: Simatelex Manufactory Co., Ltd., Hong Kong SAR (CN)

( * ) Notice: Subject to any disclaimer, the term of this patent is extended or adjusted under 35 U.S.C. 154(b) by 285 days.

(21) Appl. No.: 11/359,562

(22) Filed: Feb. 23, 2006

(65) Prior Publication Data

US 2007/0194032 A1 Aug. 23, 2007

(51) Int. Cl.
*A47J 43/046* (2006.01)
(52) U.S. Cl. ............................... 241/285.3; 241/282.1
(58) Field of Classification Search ............. 241/282.1, 241/282.2, 92, 285.2, 285.3, 291, 199.12
See application file for complete search history.

(56) References Cited

U.S. PATENT DOCUMENTS 1,211,343 A * 1/1917 Pershing .................. 241/285.2
4,614,306 A * 9/1986 Doggett ..................... 241/37.5

* cited by examiner

*Primary Examiner*—Mark Rosenbaum
(74) *Attorney, Agent, or Firm*—Leydig, Voit & Mayer, Ltd.

(57) ABSTRACT

A food processor bowl includes a container having a coaxial inner sleeve for locating a rotary tool in the container and a dispensing opening. A removable closure for the container has an open position for dispensing contents from the container and a closed position for defining a processing chamber in the container. A support extends across the dispensing opening and has a central hub for retaining a rotary tool within the container when contents of the container are being dispensed through the dispensing opening.

8 Claims, 4 Drawing Sheets

FOOD PROCESSOR BOWL AND FOOD PROCESSOR

FIELD OF THE INVENTION

The present invention relates to food processors and in particular to food processor bowls.

BACKGROUND TO THE INVENTION

Domestic food processors include a bowl into which can be located one of a variety of processing tools for cutting, chopping or otherwise preparing foodstuffs. Each of the tools may be separate from each other and is generally disposed into the food processing bowl individually for performing a particular operation. Alignment of the bowl to the main body can be difficult as the interlocking of the various members of the apparatus involves numerous steps.

One disadvantage with known food processors is that after finishing the processing for one kind of food, a user must take time to disassemble the tools for the removal of the processed foodstuff from the bowl. To continue processing another food, the user must perform a plurality of assembly steps to start again.

OBJECT AND SUMMARY OF THE INVENTION

It is an object of the present invention to overcome or substantially ameliorate the above disadvantage and/or more generally to provide a food processor bowl from which the processor tool need not be removed for dispensing/removal of foodstuff contents from the bowl.

There is disclosed herein a food processor bowl in which a rotary tool can be located for cutting or chopping foodstuffs, the bowl comprising:
 a container having a cylindrical wall and an open end,
 a closure for closing the open end to define a processing chamber in the container, the closure having an open position for dispensing prepared foodstuffs from within the container, and
 a support member extending across the open end for retaining a rotary tool within the container when prepared foodstuffs are being dispensed from within the container.

Preferably, the support member comprises a hub at the center of the open end and at least two radial spokes extending between the hub and the container wall.

Preferably, the support member comprises at least four radial spokes extending between the hub and the container wall.

Preferably, the support member comprises an outer ring removeably attached to the container wall, a hub at the center of the ring and at least two radial spokes extending between the hub and the ring.

Preferably, the open end is an upper end of the container and the support member has a central distension for engaging a top of a processor tool located in the container.

Preferably, the open end is a lower end of the container and the support member has a central sleeve coaxial with the container wall for supporting a processor tool located in the container.

Preferably, the closure is hinged to the container wall.

Preferably, the closure is held closed by a resilient catch and the container includes a handle having a button for releasing the catch when pressed to allow the closure to open.

There is also disclosed herein a food processor comprising a housing enclosing a motor and having a base with a rotateable shaft extending from the base, and the food processor bowl as previously defined.

Further aspects of the invention will become apparent from the following description.

BRIEF DESCRIPTION OF THE DRAWINGS

A preferred form of the present invention will now be described by way of example only and with reference to the accompanying drawings in which.

DETAIL DESCRIPTION OF THE PREFERRED EMBODIMENT

Figure 2:
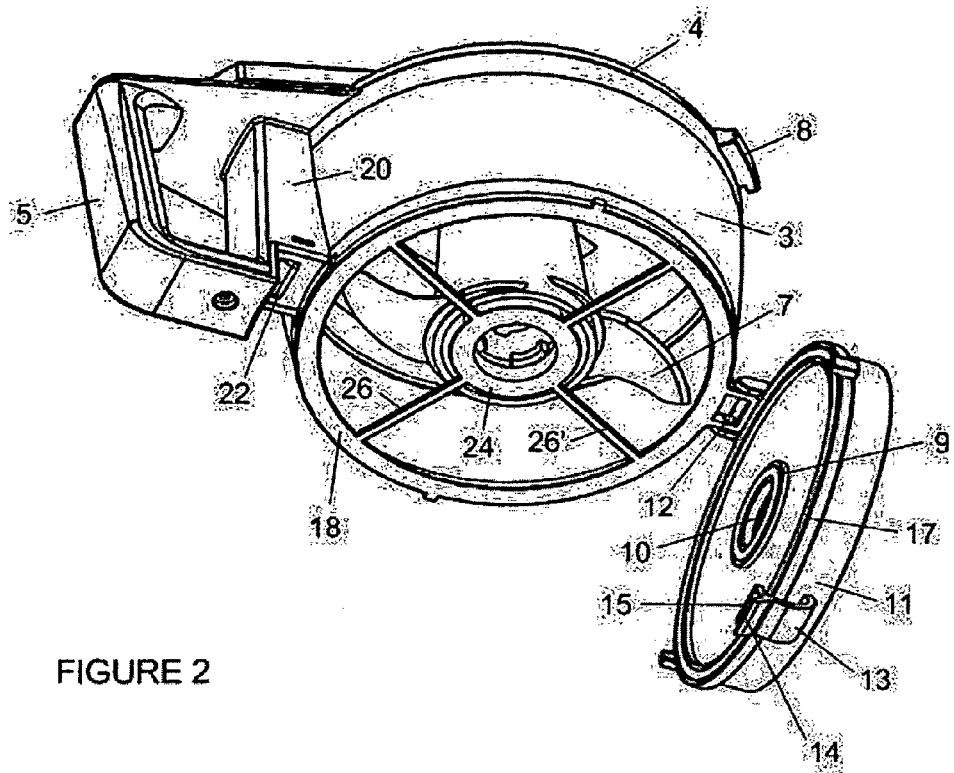
FIG. 2 is a bottom perspective view of the bowl of FIG. 1.
Figure 1:
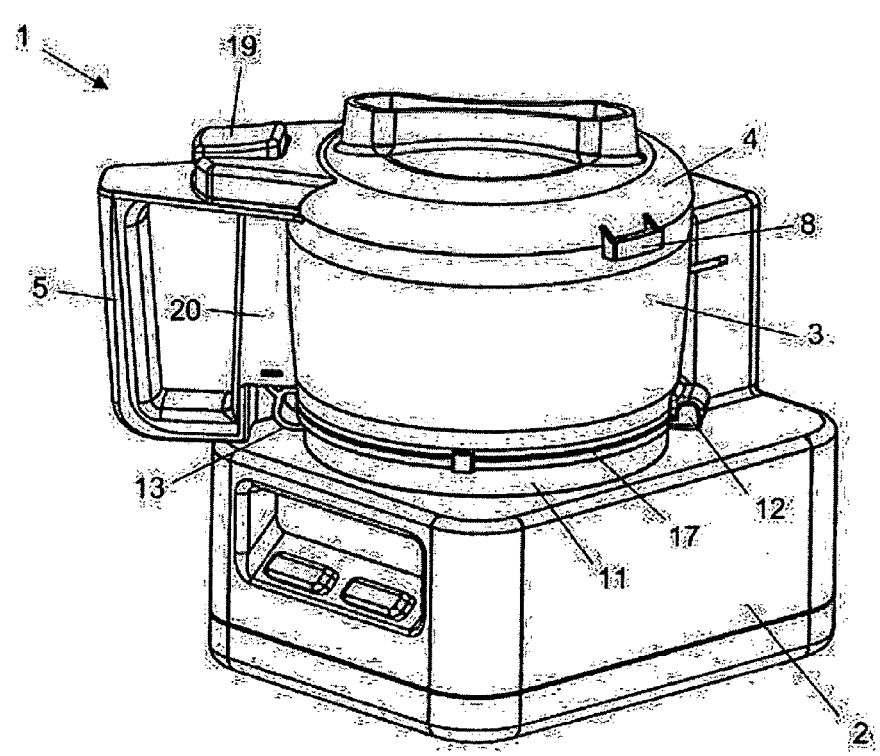
FIG. 1 is a perspective view of a food processor and first embodiment of a food processor bowl according to the invention.
Figure 3:
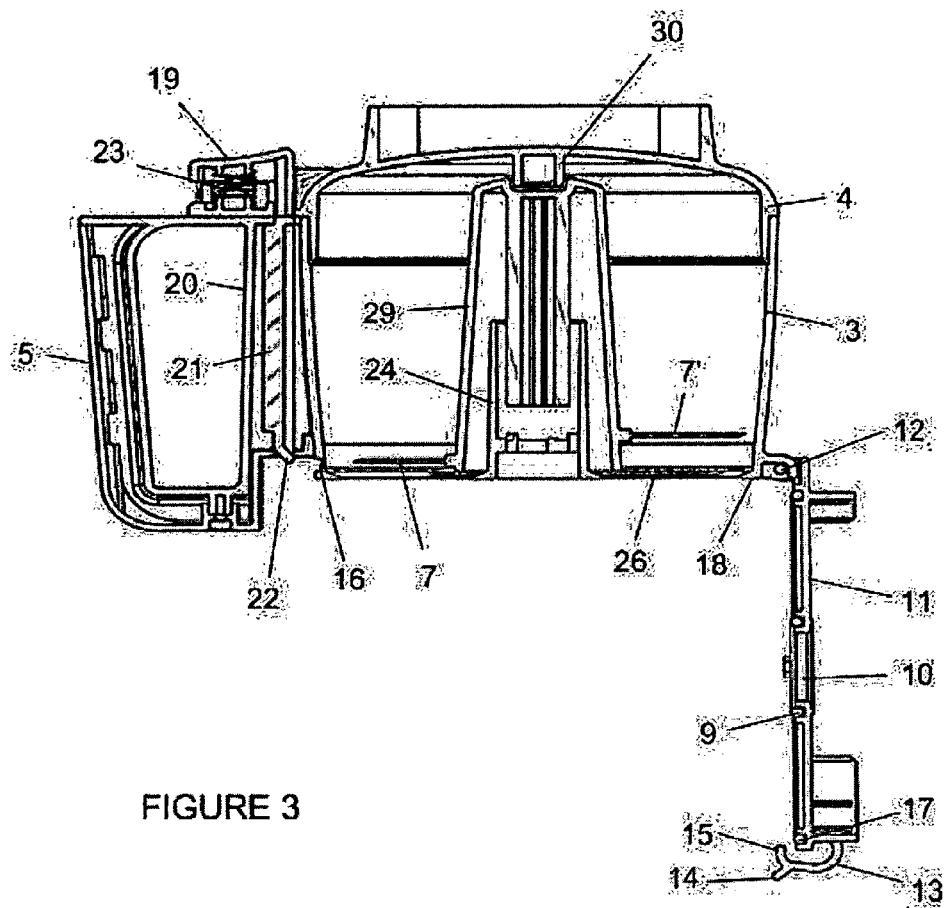
FIG. 3 is a sectional side view of the bowl of FIG. 1 with a closure open.
Figure 4:
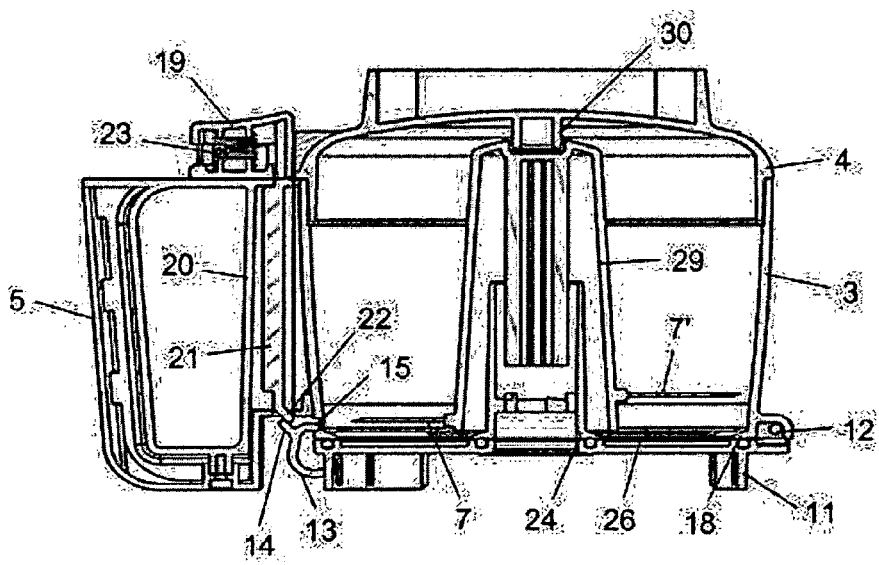
FIG. 4 is a sectional side view of the bowl of FIG. 1 with the closure closed.

In FIGS. 1 to 4 there is depicted a preferred embodiment of a food processor bowl 1 for use with a food processor 2 having a housing enclosing a motor and a base with a rotateable shaft extending from the base. The bowl 1 comprises a cylindrical walled container 3 with open upper and lower ends. A removable lid 4 closes the upper end of the container and a closure 11 closes the lower end of the container to form a closed processing chamber. A distension 30 on the underside of lid 4 engages the top of a processor tool 29 in the bowl when the lid 4 is in place. The lower closure 11 has an aperture 10 so that when the bowl is located on the food processor base the rotateable shaft extends through the sleeve to engage and rotate the processor tool on known manner. The upper rim of wall 3 has a safety tab 8 as is known. A handle 5 is located on one side of the wall 3 for handling the bowl.

The lower closure 11 is attached to the container wall 3 by a hinge 12 so that it can swing open and contents of the container can be dispensed through the lower end of the container. For processing, the closure 11 is secured in the closed position by a resiliently flexible catch 13 having a projecting tab 14. A lip 15 at the distal end of the catch 13 locates in a groove 16 of the wall 3 adjacent the base of handle 5. The closure 11 is sealed by inner and outer o-rings 9, 17.

The closure 11 is opened by depressing a button 19 located on the top of handle 5. The handle 5 includes a conduit 20 against the wall 3 from its top to its bottom. An activation rod 21 is located within the conduit 20 and has a tapered lower end 22. The top of rod 21 is engaged by the button 19 to make tapered end 22 push tab 14 bending the catch 13 until lip 15 clears grove 16 to release closure 11. The button 19 and rod 21 are biased in the up position by spring 23 under button 19.

The container 3 has a concentric inner sleeve 24 on to which the removable processor tool 29 with blades 7 is located. The sleeve 24 is attached to the outer wall 3 by a support member comprising an outer ring 18 attached to the edge of the container wall 3, and four radial spokes 26 extending between the sleeve 24 and the ring 3. The spokes of the support member extending across the lower end of the container allowing foodstuffs to be dispensed from within the container while supporting the sleeve 24 and rotary tool 29.

Figure 5:
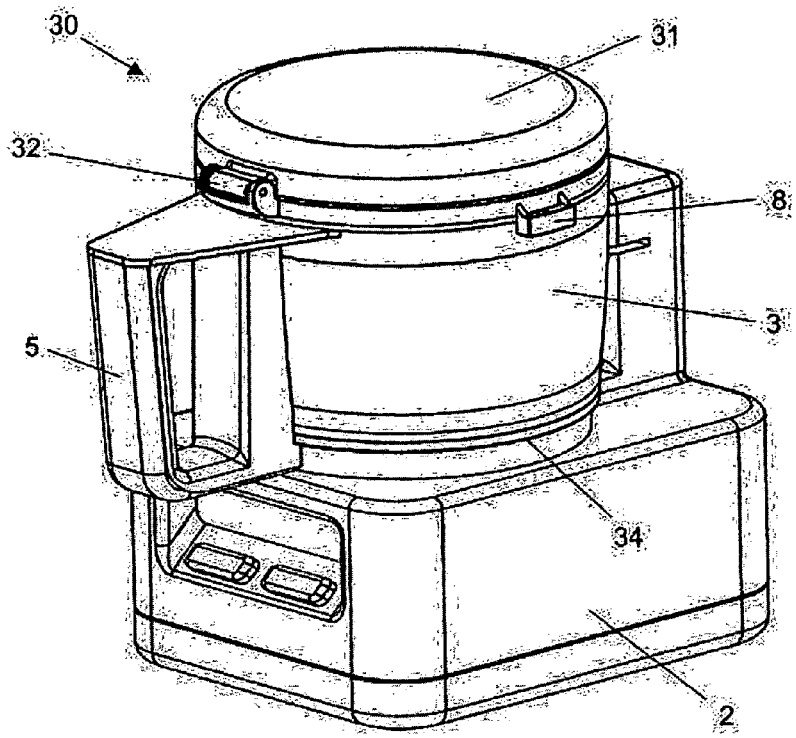
FIG. 5 is a perspective view of a food processor and second embodiment of a food processor bowl according to the invention.
Figure 6:
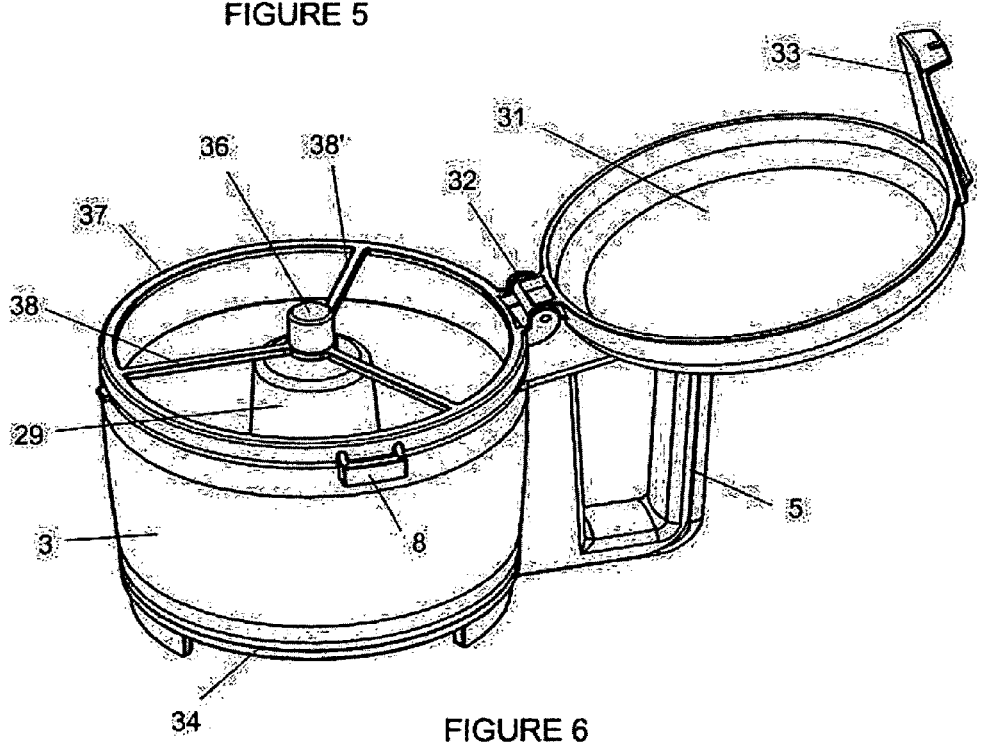
FIG. 6 is a top perspective view of the bowl of FIG. 5.
Figure 7:
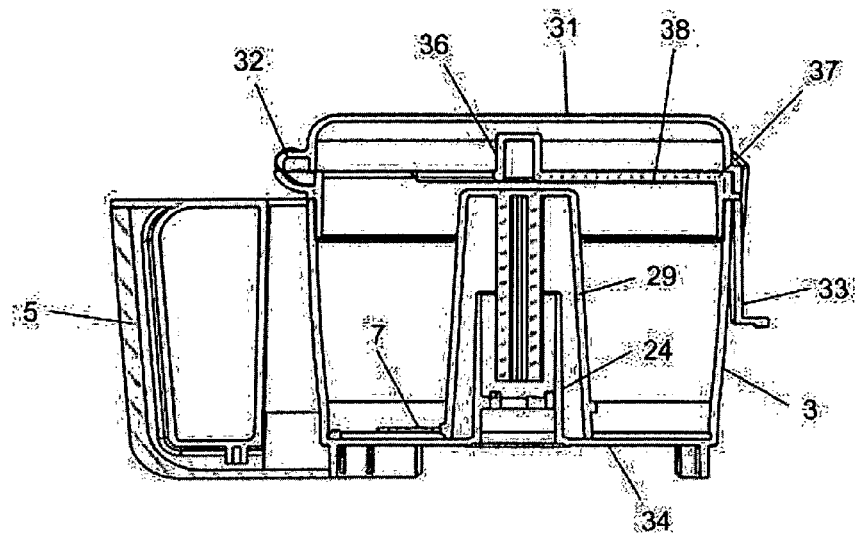
FIG. 7 is sectional side view of the bowl of FIG. 5 with the closure open.
Figure 8:
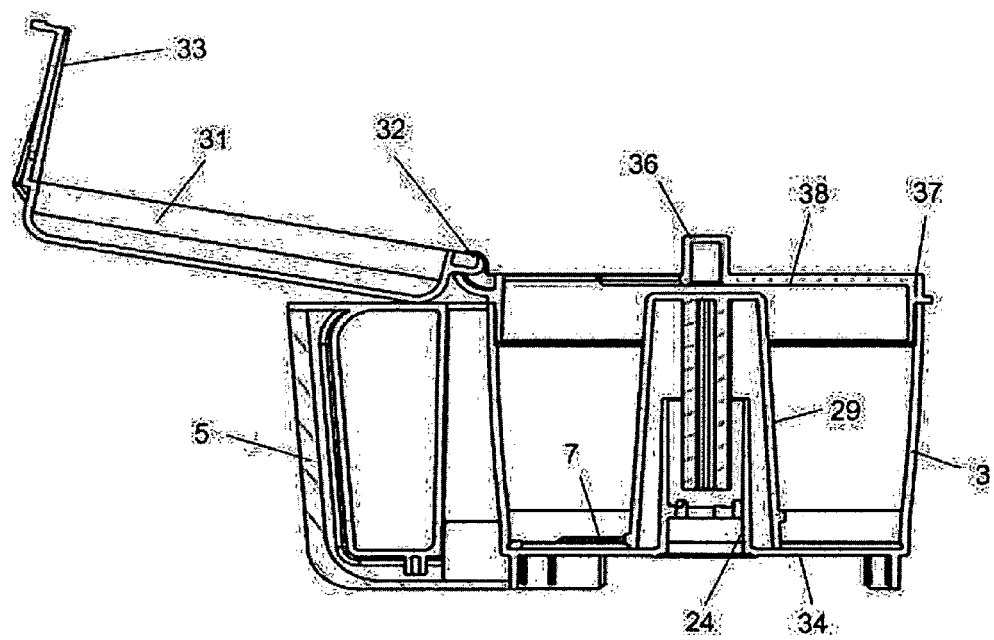
FIG. 8 is a sectional side view of the bowl of FIG. 5 with a closure closed.

FIGS. 5 to 8 illustrate a second embodiment of the invention where the container 3 has a bottom wall 34 closing its lower end and foodstuffs are dispensed through the open upper end of the container by removing lid 31. When the lid 31 is open the bowl is inverted for dispensing its contents. To retaining the rotary tool 29 within the inverted container a support member extends across the open end. The support member comprises an outer ring 37 removeably attached to the rim of container wall 3 and three radial spokes 38 supporting a hub 36 above the top of processor tool 29. A distension on the underside of hub 36 engages the top of the processor tool when the bowl is inverted holding the tool 29 in place.

It should be appreciated that modifications and/or alternations obvious to those skilled in the art are not to be considered as beyond the scope of the present invention.

What is claimed is:

1. A food processor bowl in which a rotary tool can be located for cutting or chopping foodstuffs, the bowl comprising:
    a container having a cylindrical wall with an open end,
    a closure having a closed position for closing the open end to define a processing chamber in the container, and an open position for dispensing prepared foodstuffs from within the container, and
    a support member extending across the open end of the container for retaining a rotary tool within the container when prepared foodstuffs are being dispensed from within the container, wherein the support member comprises a hub located in the open end of the container and at least two spokes extending between the hub and the cylindrical wall.

2. The food processor bowl of claim 1 wherein the support member comprises at least four radial spokes extending between the hub and the cylindrical wall.

3. The food processor bowl of claim 1 wherein the support member comprises an outer ring removeably attached to the cylindrical wall and a hub located centrally in the ring, and the at least two radial spokes extend between the hub and the ring and are attached to the ring.

4. The food processor bowl of claim 1 wherein the open end of the container is an upper end of the container and the support member includes a central distension for engaging a processor tool located in the container.

5. The food processor bowl of claim 1 wherein the closure is hingedly connected to the cylindrical wall.

6. The food processor bowl of claim 1 including a resilient catch for holding the closure in the closed position, wherein the container includes a handle having a button for releasing the catch, when the button pressed, opening the closure.

7. A food processor bowl in which a rotary tool can be located for cutting or chopping foodstuffs, the bowl comprising:
    a container having a cylindrical wall and an open end that is a lower end of the container,
    a closure having a closed position closing the open end to define a processing chamber in the container and an open position for dispensing prepared foodstuffs from within the container, and
    a support member extending across the open end of the container for retaining the rotary tool within the container when prepared foodstuffs are being dispensed from within the container, wherein the support member includes a central sleeve coaxial with the cylindrical wall for supporting a processor tool located in the container.

8. The food processor bowl of claim 7 including a resilient catch for holding the closure in the closed position, wherein the container includes a handle having a button for releasing the catch, when the button pressed, opening the closure.

* * * * *